(12) United States Patent
Liang et al.

(10) Patent No.: US 11,614,362 B1
(45) Date of Patent: Mar. 28, 2023

(54) METHOD OF DIGITAL MEASURING COLOR OF FABRICS BASED ON DIGITAL CAMERA

(71) Applicant: WUHAN TEXTILE UNIVERSITY, Hubei (CN)

(72) Inventors: Jin Xing Liang, Hubei (CN); Zhuan Zuo, Hubei (CN); Jing Zhou, Hubei (CN); Xin Rong Hu, Hubei (CN); Ru Han He, Hubei (CN); Qi Liu, Hubei (CN); Li Kun Xie, Hubei (CN); Jing Yao Cheng, Hubei (CN); Hong Huan Yang, Hubei (CN); Xin Ran Li, Hubei (CN); Ran Jin, Hubei (CN); Ling Yue Gao, Hubei (CN)

(73) Assignee: WUHAN TEXTILE UNIVERSITY, Hubei (CN)

( * ) Notice: Subject to any disclaimer, the term of this patent is extended or adjusted under 35 U.S.C. 154(b) by 0 days.

(21) Appl. No.: 17/869,771

(22) Filed: Jul. 20, 2022

(30) Foreign Application Priority Data

Feb. 24, 2022 (CN) .......................... 202210169547.9

(51) Int. Cl.
  *G01J 3/46* (2006.01)
  *G06T 7/90* (2017.01)
  *G06T 7/00* (2017.01)

(52) U.S. Cl.
  CPC ............... *G01J 3/46* (2013.01); *G06T 7/001* (2013.01); *G06T 7/0004* (2013.01); *G06T 7/90* (2017.01); *G06T 2207/30124* (2013.01)

(58) Field of Classification Search
  None
  See application file for complete search history.

(56) References Cited

FOREIGN PATENT DOCUMENTS

| CN | 102714687 | 10/2012 |
|----|-----------|---------|
| CN | 103389162 | 11/2013 |
| CN | 106896069 | 6/2017 |
| CN | 110044485 | 7/2019 |

(Continued)

OTHER PUBLICATIONS

Xiaoxia Wan et al., "Optimization study of non-contact color measurement parameters", Spectroscopy and Spectral Analysis, vol. 36, No. 9, Sep. 30, 2016, with English translation thereof, pp. 1-13.

(Continued)

*Primary Examiner* — Rufus L Phillips
(74) *Attorney, Agent, or Firm* — JCIP Global Inc.

(57) ABSTRACT

A method of digital measuring the color of fabrics based on digital camera, includes: making plain fabric samples; obtaining ground-truth color of plain fabrics using a spectrophotometer; capturing a raw format digital image of the plain fabrics using the digital camera and extracting raw camera responses of the plain fabrics; capturing a raw format digital image of a target fabric and extracting the raw camera responses of a ROI in the target fabric; calculating a Euclidean distance and a similarity coefficient between the raw camera responses of the ROI in the target fabric and the plain fabrics; normalizing the Euclidean distance and the similarity coefficient; calculating a weighting coefficient of each color data of the plain fabrics based on the normalized Euclidean distance and similarity coefficient; weighting every color data of plain fabrics with a corresponding weighting coefficient; and summing the weighted color data of the plain fabrics.

10 Claims, 2 Drawing Sheets

(56) References Cited

FOREIGN PATENT DOCUMENTS

| | | |
|---|---|---|
| CN | 111750994 | 10/2020 |
| CN | 113096072 | 7/2021 |
| WO | 2011089094 | 7/2011 |

OTHER PUBLICATIONS

R. L. Graham, "An Efficient Algorith for Determining the Convex Hull of a Finite Planar Set", Information Processing Letters, 1972, 1: 132-133, Jan. 28, 1972, pp. 132-133.
"Search Report of China Counterpart Application", with English translation thereof, dated Mar. 14, 2022, p. 1-p. 4.

METHOD OF DIGITAL MEASURING COLOR OF FABRICS BASED ON DIGITAL CAMERA

CROSS-REFERENCE TO RELATED APPLICATION

This application claims the priority benefit of China application serial no. 202210169547.9, filed on Feb. 24, 2022. The entirety of the above-mentioned patent application is hereby incorporated by reference herein and made a part of this specification.

TECHNICAL AREA

This invention belongs to digital image processing in the field of computer science, a method of digital measuring the color of fabrics based on a digital camera is provided.

BACKGROUND

Color is the important appearance and function features of textile products such as dyed cotton, yarns and fabrics. On one hand, the color of the fabric affects consumers' preference, which in turn affects the sales of clothing. On the other hand, in the field of professional application, such as the design and application of camouflage clothing, the very important hidden function will be realized through imitation of the wild environment using cloth color design technology. Color control is the key technology in the textile manufacturing process, and color measurement is an important prerequisite for color control. However, the variety of fabrics and the diversity of structure and morphology hinder the accurate measurement of fabric color.

In the field of fabric color measurement, the traditional method mainly to evaluate the color difference and consistency based on human visual system with referencing standard color chips. However, due to subjective differences such as the age, gender and work experience, it cannot avoid the inconsistencies of color evaluation between different people for the same fabric samples. In addition, the human-based color evaluation is relatively low efficiency. In terms of the deficiency of human-based color evaluation, the professional optical measurement equipment such as spectrophotometer is invented to measure color with high efficiency and accuracy, which has become the mainstream method for fabric color measurement. But the spectrophotometer can only measure the color of flatten object using the contact way, it cannot directly measure the color of objects with irregular shapes. Furthermore, it also cannot accurately measure the color of textile fabrics with complex patterns or special structures, slender yarns, soft cotton, etc. Currently, the limitations of spectrophotometer in fabric color measurement have not been addressed, either for academia or industry.

SUMMARY

To resolve the issues that exist in the field of the art, the disclosure provides a method of digital measuring the color of fabrics based on a digital camera. As the color data of fabrics is highly correlated with its digital camera responses, it is theoretically feasible to measure the color of the fabric based on the imaging technology of the digital camera. For digital camera-based color measurement, the digital image of target fabric is firstly captured and based on the mathematical inversion of a digital imaging model, the color of target fabrics can be calculated efficiently. The method of digital camera-based and non-contact color measurement can be applied to fabric and other objects with arbitrary morphological structures and complex patterns, which can effectively avoid the shortcomings of human visual based color evaluation and the limitations of spectrophotometer in the practical application. Fast and flexible measurement and analysis of the color of various types of fabrics can be achieved using digital camera-based color measurement.

For issues that exist in the aspect of measuring complex fabric color with the spectrophotometer currently, the present disclosure provides a method for measuring the color of the fabric. Firstly, collects and makes the plain fabric samples and measures them to acquire the color data. Secondly, the digital image of a region of interest (ROI) of the plain fabrics and target fabrics are captured using the digital camera and the corresponding camera responses are extracted. Then the Euclidean distance and similarity coefficient between the raw camera responses of the ROI in the target fabric and the plain fabrics are calculated to obtain the weighting coefficient of the plain fabric. Finally, using the weighting coefficient to sum up the weighted color data of the plain fabrics to get the color data of the ROI in the target fabric. The present disclosure discloses a method of digital measuring color of fabrics based on the digital camera. The method comprises:

step 1: making plain fabric samples;

step 2: obtaining the ground-truth color of plain fabrics using a spectrophotometer;

step 3: capturing a raw format digital image of the plain fabrics using a digital camera and extracting the raw camera responses of them;

step 4: capturing the raw format digital image of a target fabric and extracting the raw camera response of a region of interest (ROI) in the target fabric;

step 5: calculating the Euclidean distance and similarity coefficient between the raw camera responses of the ROI in the target fabric and the plain fabrics;

step 6: normalizing the Euclidean distance and the similarity coefficient;

step 7: calculating the weighting coefficient of each color data of the plain fabrics based on the normalized Euclidean distance and similarity coefficient;

step 8: weighting each of the color data of plain fabrics with a corresponding weighting coefficient;

step 9: summing the weighted color data of the plain fabrics to get the color data of the ROI in the target fabric.

Further, for making plain fabric samples in the step 1, since the color distribution of the plain fabric sample directly affects the accuracy of the color measurement of the target fabric, the larger the color gamut volume of the plain fabric sample, and the more uniform the sample is distributed in the color space, the better the color measurement accuracy. The specific production method is as follows.

Firstly, collecting the historical color data of plain fabric samples, and using the convex hull algorithm to extract the convex hull color data (named as $C_{hull}$) of them. The details of convex hull algorithm can be found in reference 1: Graham R L. An efficient algorithm for determining the convex hull of a finite planar set. Info. Pro. Lett., 1972, 1:132-133.

Then, investigate and acquire the maximum level of color difference (named as $\Delta E$) when producing the plain fabrics. After that, using the collected convex hull color data ($C_{hull}$) and the color difference ($\Delta E$) as inputs to generate the color dataset of plain fabric samples based on the proposed method provided in the proposed color system production method. The details of color system production method can be found in reference 2: Li Yuan and Jinxing Liang. A method for constructing the color system of dyed-yarn. 2021, Chinese Patent, CN113096072A.

Finally, the plain fabric entities are produced in the textile factory, and they are fixed on white cardboards to obtain plain fabric samples.

Further, for obtaining the ground-truth color of plain fabrics using the spectrophotometer in the step 2 is as follows:

The plain fabrics is firstly measured to acquire the CIEXYZ tristimulus values. According to the colorimetry theory, the measurement principle of tristimulus values are listed in equation (1) and equation (2):

$$X = k\int_\lambda x(\lambda)E(\lambda)S(\lambda)d\lambda$$
$$Y = k\int_\lambda y(\lambda)E(\lambda)S(\lambda)d\lambda$$
$$Z = k\int_\lambda z(\lambda)E(\lambda)S(\lambda)d\lambda, \quad (1)$$

where, $$k = 100 \Big/ \left[\sum_\lambda y(\lambda)E(\lambda)d\lambda\right], \quad (2)$$

In equation (1) and equation (2), $x(\lambda)$, $y(\lambda)$ and $z(\lambda)$ are the color matching functions of standard observers, $E(\lambda)$ is the measured spectral reflectance of the object, $S(\lambda)$ is the relative spectral power distribution of the light source, $\lambda$ indicates the wavelength, k is the adjustment factor, X, Y, and Z are the tristimulus values of the plain fabrics.

Then the corresponding CIELab color data of the fabrics is calculated. According to the colorimetry, the corresponding CIELab color data of the fabrics can be calculated from the tristimulus values as shown in equation (3) and equation (4):

$$L = 116f\left(\frac{Y}{Y_n}\right) - 16 \quad (3)$$
$$a = 500\left[f\left(\frac{X}{X_n}\right) - f\left(\frac{Y}{Y_n}\right)\right],$$
$$b = 200\left[f\left(\frac{Y}{Y_n}\right) - f\left(\frac{Z}{Z_n}\right)\right]$$

where, $$\begin{cases} f\left(\frac{H}{H_n}\right) = \left(\frac{H}{H_n}\right)^{1/3} & \text{if } \left(\frac{H}{H_n}\right) > (24/116)^{1/3} \\ f\left(\frac{H}{H_n}\right) = (841/108)\left(\frac{H}{H_n}\right) + 16/116 & \text{if } \left(\frac{H}{H_n}\right) \leq (24/116)^{1/3} \end{cases}, \quad (4)$$

In equation (3) and equation (4), L, a, and b are the luminance, red-green, and yellow-blue value of the fabric in CIELab color space. X, Y, and Z are the tristimulus values of the fabrics, $X_n$, $Y_n$, and $Z_n$ are the tristimulus values of the referenced light source, H and $H_n$ represent the tristimulus values of the fabrics and the referenced light source.

Upon the completion of the measurement of the color data of the plain fabrics, the color data $c_i$ of each plain fabric is obtained. $c_i$ is a 1×3 row vector that can be expressed as equation (5):

$$c_i = (L_i, a_i, b_i) i \in (1, 2, \ldots, N), \quad (5)$$

where i indicates the ith plain fabric, i is from 1 to N, N is the total number of the plain fabrics samples, $L_i$, $a_i$, and $b_i$ are the luminance, red-green, and yellow-blue value of fabric of the ith plain fabric in the CIELab color space.

Further, for capturing the raw format digital image of plain fabrics using digital camera and extract the raw camera responses of them in the step 3, the details are as follows.

Firstly, the raw format digital images of plain fabrics are captured under uniformed illumination using the digital camera.

Then, for each digital image of the plain fabrics, the m-pixels by m-pixels raw camera responses in the central area of the fabrics are extracted, and the mean of the extracted raw format camera response values are calculated as shown in equation (6):

$$d_i = \frac{1}{m \times m} \sum_{j=1}^{m \times m} (r_{i,j}, g_{i,j}, b_{i,j}), \quad (6)$$

where, i indicates the ith plain fabric, and j indicates the jth pixel of the extracted area in the plain fabric, $r_{i,j}$, $g_{i,j}$, and $b_{i,j}$ are the red-channel, green-channel, and blue-channel raw camera responses of the jth pixel in the ith plain fabric, $d_i$ is the raw camera response of ith plain fabric, $d_i$ is a 1×3 row vector.

Further, for capturing the raw format digital image of the target fabric and extracting the raw camera response of the region of interest (ROI) in the target fabric in the step 4, the details are as follows.

Firstly, the target fabric is captured under the completely identical imaging conditions and illumination for capturing the plain fabrics, and the raw format digital image for any target fabrics is acquired using the digital camera.

Then, the region of interest (ROI) is selected manually. If the ROI just includes one pixel, the raw camera response of this pixel is directly saved. If the ROI includes more than one pixel such as L pixels, the mean of the raw camera response of these L pixels is calculated as indicated in equation (6), and the mean of the raw camera response is used as the raw camera response of ROI. The raw camera response is stored as $d_t$, $d_t$ is indicated as shown in equation (7):

$$d_t = (r_t, g_t, b_t), \quad (7)$$

where, $r_t$, $g_t$, and $b_t$ are the red-channel, green-channel, and blue-channel raw camera responses of the ROI.

Further, for calculating the Euclidean distance and the similarity coefficient between the raw camera responses of the ROI in the target fabric and the plain fabrics in the step 5, the details are as follows.

Firstly, the Euclidean distance between the raw camera responses of the ROI in the target fabric and the plain fabrics are calculated as shown in equation (8) to equation (9) and saved as a row vector:

$$e_i = \sqrt{(r_t - r_i)^2 + (g_t - g_i)^2 + (b_t - b_i)^2}, \quad (8)$$
$$e = (e_1, e_2, \ldots, e_N), \quad (9)$$

where $r_t$, $g_t$, and $b_t$ are the red-channel, green-channel, and blue-channel raw camera responses of the ROI, $r_i$, $g_i$, and $b_i$ are the red-channel, green-channel, and blue-channel raw camera responses of the ith plain fabric, $e_i$ is the Euclidean distance between the raw camera responses of the ROI in the target fabric and the plain fabrics, e is the row vector including N number of Euclidean distance.

Then, the similarity coefficient between the raw camera responses of the ROI in the target fabric and the plain fabrics are calculated as shown in equation (10) to equation (11):

$$s_i = \frac{d_t \cdot d_i}{\|d_t\| \times \|d_i\|},\qquad(10)$$

$$s = (s_1, s_2, \ldots, s_N),\qquad(11)$$

Where $d_t$ is the raw camera response vector of the ROI, $d_i$ is the raw camera response vector of the ith plain fabric, '•' indicates the vector inner product, $s_i$ is the similarity coefficient between the raw camera responses of the ROI in the target fabric and the plain fabrics, s is the row vector including N number of similarity coefficient.

Further, for normalizing the Euclidean distance and the similarity coefficient in the step 6, the details are shown in equation (12) to equation (13):

$$e_{n,i} = e_i \bullet/\max(e),\qquad(12)$$

$$s_{n,i} = s_i \bullet/\max(s),\qquad(13)$$

where, $e_{n,i}$ and $s_{n,i}$ are the normalized Euclidean distance and similarity coefficient respectively, and max(•) is the function for finding the maximum value, and '•/' means element division.

Further, for calculating the weighting coefficient of each color data of the plain fabric based on the normalized Euclidean distance and similarity coefficient in the step 7 is specifically shown in equation (14):

$$w_i = s_{n,i} \cdot \exp\left(-\frac{e_{n,i}}{2}\right),\qquad(14)$$

where, $w_i$ represents the weighting coefficient of the ith plain fabric, and exp(•) represent the exponential function.

Further, for weighting the color data of the plain fabrics with the corresponding weighting coefficient in the step 8 is specifically shown in equation (15):

$$c_{w,i} = w_i \cdot c_i = (w_i \cdot L_i, w_i \cdot a_i, w_i \cdot b_i),\qquad(15)$$

where, $c_{w,i}$ is the weighted color data of the ith plain samples, $w_i$ is the weighting coefficient of the ith plain fabric, $c_i$ is the color data of the ith plain samples, $L_i$, $a_i$, and $b_i$ are the luminance, red-green, and yellow-blue value of fabric of the ith plain fabric in the CIELab color space.

Further, for summing the weighted color data of the plain fabrics to get the color data of the ROI in the target fabric in the step 9, the method is shown in equation (16):

$$c_t = \frac{1}{N}\sum_{i=1}^{N} c_{w,i},\qquad(16)$$

where, $c_t$ is the color data of the ROI in the target fabric, $c_{w,i}$ is the weighted color data of the ith plain samples, N is the total number of plain fabrics. So far, the color measurement of the ROI in the target fabric based on the digital camera is completed.

The method of measuring the color of fabrics based on a digital camera has the following beneficial effects: the method can overcome the limitation of spectrophotometer on color measurement of fabrics, it makes full use of the high correlation between the color data and camera response of fabric, and provide the digital camera-based color measurement method. The method can perform fast non-contact color measurement of objects with irregular shapes, textile fabrics with complex patterns or special structures, slender yarns, soft cotton, etc.

DETAILED DESCRIPTION OF THE EMBODIMENTS

To further illustrate, embodiments detailing a method of digital measuring the color of fabrics based on digital camera are described below. It should be noted that the following embodiments are intended to describe and not to limit the disclosure. When implementing the embodiments of the disclosure, the person of in the field of art may adopt computer software to implement.

Figure 1:
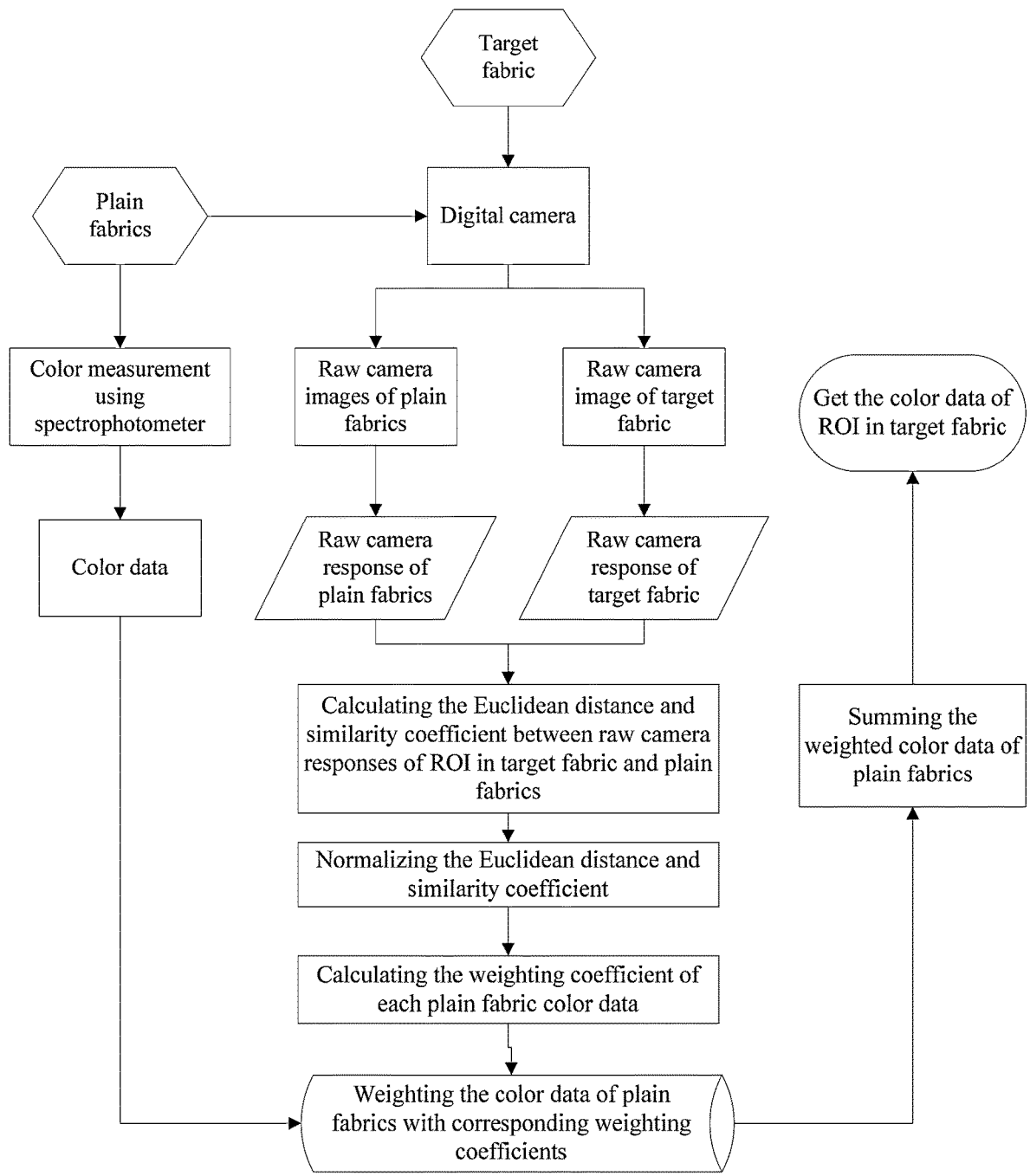
FIG. 1 is a flowchart of digital measuring the color of fabrics based on digital camera.

By referencing to FIG. 1, the embodiment of disclosure of a method of digital measuring color of fabrics based on a digital camera comprises the following steps:

Step 1: making plain fabric samples;

Step 2: obtaining the ground-truth color of plain fabrics using the spectrophotometer;

Step 3: capturing the raw format digital image of plain fabrics using a digital camera and extracting the raw camera responses of them;

Step 4: capturing the raw format digital image of a target fabric and extracting the raw camera response of a region of interest (ROI) in a target fabric;

Step 5: calculating the Euclidean distance and similarity coefficient between the raw camera responses of the ROI in the target fabric and the plain fabrics;

Step 6: normalizing the Euclidean distance and the similarity coefficient;

Step 7: calculating the weighting coefficient of each color data of the plain fabric based on the normalized Euclidean distance and similarity coefficient;

Step 8: weighting the color data of the plain fabrics with the corresponding weighting coefficient;

Step 9: summing the weighted color data of the plain fabrics to get the color data of the ROI in the target fabric.

Each step of the process is explained via the following embodiments: embodiment is carried out based on the plain fabric weaving technique, a X-rite Color i7 spectrophotometer, a digital camera of Canon 600D and a light box with a model of VeriVide DigiEye to carry out the tests of the embodiments.

In step 1, 1872 historical color data of plain fabrics are collected from company A, and 237 convex hull color data are extracted using convex hull algorithm (see reference 1). The maximum level of color difference of ΔE of the color of fabrics at the company A is 3.5 units. 1236 color data of plain fabrics are generated using the previously proposed color system production method (see reference 2). The 1236 plain fabric samples are produced and fixed on white cardboards through proofing process. In addition, 20 jacquard fabrics are also produced as test targets.

In step 2, by adopting X-rite Color i7 spectrophotometer, the ground-truth color data of all plain fabrics are acquired. In the measurement, the CIEXYZ tristimulus values of plain fabrics is firstly measured. The details of calculating CIEXYZ are listed in equation (1) and equation (2):

$$X = k\int_\lambda \bar{x}(\lambda)E(\lambda)S(\lambda)d\lambda$$

$$Y = k\int_\lambda \bar{y}(\lambda)E(\lambda)S(\lambda)d\lambda$$

$$Z = k\int_\lambda \bar{z}(\lambda)E(\lambda)S(\lambda)d\lambda,\qquad(1)$$

where, $$k = 100 / \left[ \sum_\lambda y(\lambda) E(\lambda) d\lambda \right], \quad (2)$$

In equation (1) and equation (2), $x(\lambda)$, $y(\lambda)$ and $z(\lambda)$ are the color matching functions of standard observers, $E(\lambda)$ is the measured spectral reflectance of the object, $S(\lambda)$ is the relative spectral power distribution of the light source, $\lambda$ indicates the wavelength, k is the adjustment factor, X, Y, and Z are the tristimulus values of the plain fabrics. After acquiring the tristimulus values, the corresponding CIELab color data of the fabrics can be further calculated as shown in equation (3) and equation (4) to complete the color measurement of the plain fabrics. In an embodiment, CIED65 standard light source that is frequently used in the field of art is adopted as the reference light source when calculating the CIELab color data of the fabrics.

$$L = 116 f\left(\frac{Y}{Y_n}\right) - 16 \quad (3)$$
$$a = 500\left[f\left(\frac{X}{X_n}\right) - f\left(\frac{Y}{Y_n}\right)\right],$$
$$b = 200\left[f\left(\frac{Y}{Y_n}\right) - f\left(\frac{Z}{Z_n}\right)\right]$$

where, $$\begin{cases} f\left(\frac{H}{H_n}\right) = \left(\frac{H}{H_n}\right)^{1/3} & \text{if } \left(\frac{H}{H_n}\right) > (24/116)^{1/3} \\ f\left(\frac{H}{H_n}\right) = (841/108)\left(\frac{H}{H_n}\right) + 16/116 & \text{if } \left(\frac{H}{H_n}\right) \le (24/116)^{1/3} \end{cases}, \quad (4)$$

In equation (3) and equation (4), L, a, and b are the luminance, red-green, and yellow-blue values of fabric in the CIELab color space. X, Y, and Z are the tristimulus values of the fabrics, $X_n$, $Y_n$, and $Z_n$ are the tristimulus values of reference light source, H and $H_n$ in equation (4) represents the tristimulus values of the plain fabrics and the reference light source. Upon completing the measurement of ground-truth color data of the plain fabrics, the color data of each plain fabric sample $c_i$ is obtained. $c_i$ is a 1×3 row vector that can be expressed as equation (5):

$$c_i = (L_i, a_i, b_i) i \in (1, 2, \ldots, N), \quad (5)$$

where i indicates the ith plain fabric, the value of i is from 1 to N. N is the total number of plain fabric samples, $L_i$, $a_i$, and $b_i$ are the luminance, red-green, and yellow-blue value of fabric of the ith plain fabric in the CIELab color space. In an embodiment, the value of N is 1236.

In step 3, after completing the measurement of the ground-truth color data of the plain fabrics, the raw format digital images of plain fabrics are captured in VeriVide DigiEye light box with uniform illumination in order, the raw format images are saved (in *.CR2 format). For each digital image of the plain fabrics, every pixels in a m×m pixels area near the central area of the digital image are extracted as raw camera response and a mean of the raw camera responses of the m×m pixels are calculated that is expressed in equation (6):

$$d_i = \frac{1}{m \times m} \sum_{j=1}^{m \times m} (r_{i,j}, g_{i,j}, b_{i,j}), \quad (6)$$

where, i indicates the ith plain fabric, and j indicates the jth pixel of the extracted area in the plain fabric, $r_{i,j}$, $g_{i,j}$, and $b_{i,j}$ are the red-channel, green-channel, and blue-channel raw camera responses of the jth pixel in the ith plain fabric, $d_i$ is the raw camera response of the ith plain fabric, $d_i$ is a 1×3 row vector. The value of m is 100 in the embodiments.

In step 4, after the capturing of raw format digital image of the plain fabrics and the extraction of the raw camera responses are completes, the same imaging conditions as plain fabrics, using the digital camera to acquire the digital images of target jacquard fabrics under the same illumination and imaging conditions for capturing the plain fabrics. The region of interest (ROI) is selected manually for each target jacquard fabric, and the corresponding raw camera response is acquired. It should be noted that if the ROI just includes one pixel, the raw camera response of this pixel is directly saved as $d_t$. $d_t$ is a raw camera response row vector with a dimension of 1×3. If the ROI includes L pixels, a mean of the raw camera responses of these L pixels is calculated as indicated in equation (6), and the mean of the raw camera responses is save as $d_t$, as shown in equation (7):

$$d_t = (r_t, g_t, b_t), \quad (7)$$

where, $r_t$, $g_t$, and $b_t$ are the red-channel, green-channel, and blue-channel raw camera responses of ROI. In the embodiments, the ROI is randomly selected with make sure the selected area is a pure color.

In step 5, after completing the extraction of the raw camera responses of the ROI, the Euclidean distance and similarity coefficient between the raw camera responses of the ROI in the target fabric and plain fabrics are calculated. The details are as follows.

Firstly, the Euclidean distance between the raw camera responses of ROI in the target fabric and the plain fabrics are calculated as shown in equation (8) to equation (9):

$$e_i = \sqrt{(r_t - r_i)^2 + (g_t - g_i)^2 + (b_t - b_i)^2}, \quad (8)$$

$$e = (e_1, e_2, \ldots, e_N), \quad (9)$$

where $r_t$, $g_t$, and $b_t$ are the red-channel, green-channel, and blue-channel raw format camera responses of the ROI, $r_i$, $g_i$, and $b_i$ are the red-channel, green-channel, and blue-channel raw format camera responses of the ith plain fabric, $e_i$ is the Euclidean distance between raw format camera responses of the ROI in the target fabric and plain fabrics, e is the row vector including N number of Euclidean distance.

Then, the similarity coefficient between the raw camera responses of the ROI in the target fabric and the plain fabrics are calculated as shown in equation (10) to equation (11):

$$s_i = \frac{d_t \cdot d_i}{\|d_t\| \times \|d_i\|}, \quad (10)$$

$$s = (s_1, s_2, \ldots, s_N), \quad (11)$$

where $d_t$ is the raw camera response vector of the ROI, $d_i$ is the raw camera response vector of the ith plain fabric, '·' indicates the vector inner product, $s_i$ is the similarity coefficient between the raw camera responses of the ROI in the target fabric and the plain fabrics, s is the row vector including N number of similarity coefficient.

In step 6, after the calculation of the Euclidean distance and similarity coefficient between the raw camera responses of the ROI in the target fabric and the plain fabrics is completed, the Euclidean distance and similarity coefficient are normalized as expressed in equation (12) to equation (13):

$$e_{n,i} = e_i \bullet / \max(e), \tag{12}$$

$$s_{n,i} = s_i \bullet / \max(s), \tag{13}$$

where, $e_{n,i}$ and $s_{n,i}$ are the normalized Euclidean distance and the normalized similarity coefficient respectively, and max(•) is the function for finding the maximum value, and '•/' means element division.

In step 7, after the normalization of the Euclidean distance and similarity coefficient between the raw camera responses of the ROI in the target fabric and the plain fabrics is completed, the weighting coefficient of each color data of the plain fabrics based on the normalized Euclidean distance and similarity coefficient are calculated as expressed in equation (14):

$$w_i = s_{n,i} \cdot \exp\left(-\frac{e_{n,i}}{2}\right), \tag{14}$$

where, $w_i$ represents the weighting coefficient of the ith plain fabric, and exp(•) represents the exponential function.

In step 8, after the normalization of weighting coefficient of each color data of the plain fabrics is completed, weighting the color data with the corresponding weighting coefficient of the plain fabrics is carried out as expressed in equation (15):

$$c_{w,i} = w_i \cdot c_i = (w_i \cdot L_i, w_i \cdot a_i, w_i \cdot b_i), \tag{15}$$

where, $c_{w,i}$ is the weighted color data of the ith plain fabrics, w is the weighting coefficient of the color data of the ith plain fabric, $c_i$ is the color data of the ith plain fabric, $L_i$, $a_i$, and $b_i$ are the luminance, red-green, and yellow-blue values of the ith plain fabric in the CIELab color space.

Figure 2:
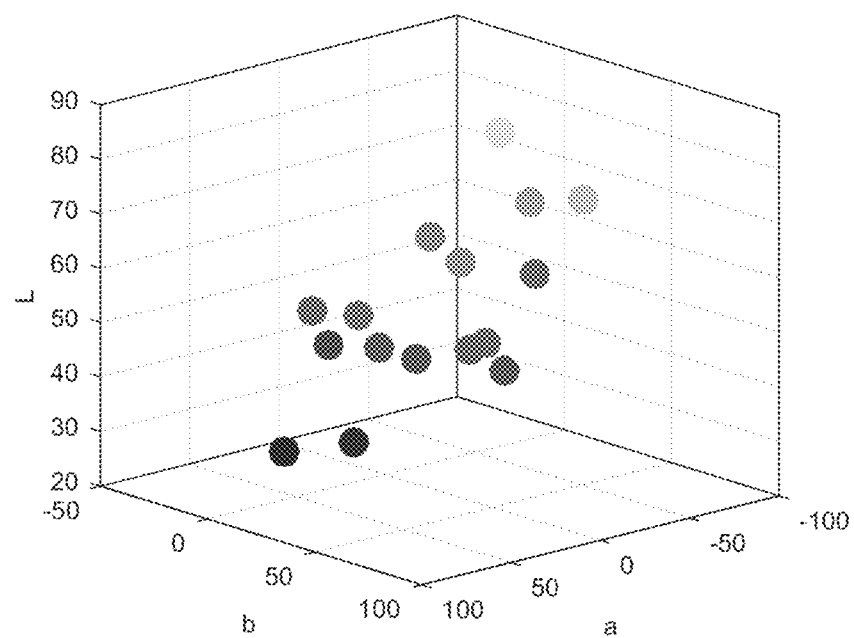
FIG. 2 is the color data distribution of 20 measured target fabrics according to one embodiment of the disclosure.

In step 9, after the weighting the color data with the corresponding weighting coefficient of the plain fabrics is completed, summing the weighted color data of the plain fabrics to get the color data of the ROI in the target fabric as expressed in equation (16). To this point, the color measurement of the measuring area of the target fabric is completed.

$$c_t = \frac{1}{N} \sum_{i=1}^{N} c_{w,i}, \tag{16}$$

where, $c_t$ is the color data of the ROI in the target fabric, $c_{w,i}$ is the weighted color data of the ith plain fabric, N is the total number of plain fabrics. In the embodiments, the color measurement of 20 ROIs in 20 target fabrics according to the above-mentioned steps is completed. The corresponding color data distribution are plotted as shown in FIG. 2.

It will be obvious to those skilled in the art that changes and modifications may be made, and therefore, the aim in the appended claims is to cover all such changes and modifications.

What is claimed is:

1. A method of digital measuring color of fabrics based on a digital camera, the method comprising:
    step 1: making plain fabric samples;
    step 2: obtaining ground-truth color of plain fabrics using a spectrophotometer;
    step 3: capturing a raw format digital image of the plain fabrics using the digital camera and extracting raw camera responses of the plain fabrics;
    step 4: capturing a raw format digital image of a target fabric and extracting the raw camera responses of a region of interest (ROI) in the target fabric;
    step 5: calculating a Euclidean distance and a similarity coefficient between the raw camera responses of the ROI in the target fabric and the plain fabrics;
    step 6: normalizing the Euclidean distance and the similarity coefficient;
    step 7: calculating a weighting coefficient of each color data of the plain fabrics based on the normalized Euclidean distance and the normalized similarity coefficient;
    step 8: weighting each of the color data of the plain fabrics with a corresponding weighting coefficient; and
    step 9: summing the weighted color data of the plain fabrics to get color data of the ROI in the target fabric.

2. The method of digital measuring color of fabrics based on a digital camera of claim 1,
    wherein the making plain fabric samples in the step 1 is as follows:
    first, collecting historical color data of the plain fabric samples, and using convex hull algorithm to extract convex hull color data, represents as $C_{hull}$;
    then, investigating and acquiring a color difference, represents as ΔE, when producing the plain fabrics;
    after that, using the convex hull color data $C_{hull}$ and the color difference ΔE as inputs to generate a principal dataset of the plain fabric samples based on a color system production method;
    finally, obtaining the plain fabric samples by fixing plain fabric entities that are produced in a textile factory on a white cardboard.

3. The method of digital measuring color of fabrics based on a digital camera of claim 1, wherein the obtaining the ground-truth color of the plain fabrics using the spectrophotometer in the step 2 is as follows:
    obtaining CIEXYZ tristimulus values of the plain fabrics by measuring with the spectrophotometer; and according to colorimetry, the CIEXYZ tristimulus values are calculated as expressed in equation (1) and equation (2):

$$X = k \int_\lambda x(\lambda) E(\lambda) S(\lambda) d\lambda$$
$$Y = k \int_\lambda y(\lambda) E(\lambda) S(\lambda) d\lambda$$
$$Z = k \int_\lambda z(\lambda) E(\lambda) S(\lambda) d\lambda, \tag{1}$$

where, $$k = 100 \Big/ \left[\sum_\lambda y(\lambda) E(\lambda) d\lambda\right], \tag{2}$$

where, x(λ), y(λ) and z(λ) are color matching functions of standard observers, E(λ) is a spectral reflectance of an object measured by the spectrophotometer, S(λ) is a relative spectral power distribution of a light source, λ is a wavelength, k is an adjustment factor, X, Y, and Z are respective tristimulus values of the plain fabrics;
    with the calculated tristimulus values, the corresponding color data of fabrics are calculated as expressed in equation (3) and equation (4):

$$L = 116f\left(\frac{Y}{Y_n}\right) - 16 \qquad (3)$$

$$a = 500\left[f\left(\frac{X}{X_n}\right) - f\left(\frac{Y}{Y_n}\right)\right],$$

$$b = 200\left[f\left(\frac{Y}{Y_n}\right) - f\left(\frac{Z}{Z_n}\right)\right]$$

where, $$\begin{cases} f\left(\frac{H}{H_n}\right) = \left(\frac{H}{H_n}\right)^{1/3} & \text{if } \left(\frac{H}{H_n}\right) > (24/116)^{1/3} \\ f\left(\frac{H}{H_n}\right) = (841/108)\left(\frac{H}{H_n}\right) + 16/116 & \text{if } \left(\frac{H}{H_n}\right) \leq (24/116)^{1/3} \end{cases} \qquad (4)$$

where, L, a, and b are the luminance, red-green, and yellow-blue value of fabric in CIELab color space, X Y, and Z are the respective tristimulus values of the plain fabrics, $X_n$, $Y_n$, and $Z_n$ are tristimulus values of a referenced light source, H and $H_n$ represent tristimulus values of the plain fabrics and the referenced light source;

completing measurements of the color data of the plain fabrics to obtain color data, expressed as $c_i$, for each plain fabric, $c_i$ is a 1×3 row vector, each color data of the plain fabrics is expressed as equation (5):

$$c_i = (L_i, a_i, b_i) i \in (1, 2, \ldots, N), \qquad (5)$$

where i indicates an ith plain fabric, i is from 1 to N, N is a total number of the plain fabric samples, $L_i$, $a_i$, and $b_i$ are luminance, red-green, and yellow-blue values of the ith plain fabric in a CIELab color space.

4. The method of digital measuring color of fabrics based on a digital camera of claim 1, wherein the capturing the raw format digital image of the plain fabrics using the digital camera and extracting the raw camera responses of the plain fabrics in the step 3 is as follows:

first, capturing the raw format digital images of the plain fabrics under uniformly illuminated environment;

then, for each digital image of the plain fabrics, extracting m-by-m pixels of the raw camera responses in a central area of each digital image of the plain fabrics, and calculating a mean of the m-by-m pixels of the raw camera responses that is expressed as equation (6):

$$d_i = \frac{1}{m \times m} \sum_{j=1}^{m \times m} (r_{i,j}, g_{i,j}, b_{i,j}), \qquad (6)$$

where, i indicates an ith plain fabric, and j indicates a jth pixel of the central area extracted in the plain fabric, $r_{i,j}$, $g_{i,j}$, and $b_{i,j}$ are red-channel, green-channel, and blue-channel raw camera responses of the jth pixel in the ith plain fabric, $d_i$ is a mean of the raw camera response of the ith plain fabric which is a 1×3 row vector.

5. The method of digital measuring color of fabrics based on a digital camera of claim 1, wherein the capturing the raw format digital image of the target fabric and extracting the raw camera responses of the ROI in the target fabric in the step 4 is as follows:

first, acquiring the raw format digital image for the target fabric under same imaging condition parameters and illumination parameters for capturing the plain fabric using the digital camera;

then, selecting the ROI manually, a single pixel is saved as $d_t$ directly when the single pixel is selected as the ROI, where $d_t$ is a raw camera response row vector with a dimension of 1×3, and acquiring a mean of L pixels of the raw camera response according to equation (6) and saving the acquired mean as $d_t$ when the L pixels are included in the ROI, the dt is expressed as equation (7):

$$d_t = (r_t, g_t, b_t), \qquad (7)$$

where, $r_t$, $g_t$, and $b_t$ are red-channel, green-channel, and blue-channel of the raw camera responses of the ROI.

6. The method of digital measuring color of fabrics based on a digital camera of claim 1, wherein the calculating the Euclidean distance and the similarity coefficient between the raw camera responses of the ROI in the target fabric and the plain fabrics in the step 5 is as follows:

first, calculating the Euclidean distance between the raw camera responses of the ROI in the target fabric and the plain fabrics is expressed as equation (8) and equation (9):

$$e_i = \sqrt{(r_t - r_i)^2 + (g_t - g_i)^2 + (b_t - b_i)^2}, \qquad (8)$$

$$e = (e_1, e_2, \ldots, e_N), \qquad (9)$$

where $r_t$, $g_t$, and $b_t$ are red-channel, green-channel, and blue-channel raw format camera responses of the ROI, $r_i$, $g_i$, and $b_i$ are red-channel, green-channel, and blue-channel raw format camera responses of an ith plain fabric, $e_i$ is the Euclidean distance between the raw format camera responses of the ROI in the target fabric and the plain fabrics, e is a row vector including N number of Euclidean distances;

then, calculating the similarity coefficient between the raw camera responses of the ROI in the target fabric and the plain fabrics is expressed as equation (10) and equation (11):

$$s_i = \frac{d_t \cdot d_i}{\|d_t\| \times \|d_i\|}, \qquad (10)$$

$$s = (s_1, s_2, \ldots, s_N), \qquad (11)$$

where $d_t$ is a raw camera response vector of the ROI, $d_i$ is a raw format camera response vector of an ith plain fabric, '•' indicates a vector inner product, $S_i$ is the similarity coefficient between the raw format camera responses of the ROI in the target fabric and the plain fabrics, s is the row vector including N number of similarity coefficients.

7. The method of digital measuring color of fabrics based on a digital camera of claim 6, wherein the normalizing the Euclidean distance and the similarity coefficient in the step 6 is expressed as equation (12) to equation (13):

$$e_{n,i} = e_i \text{•/max}(e), \qquad (12)$$

$$s_{n,i} = s_i \text{•/max}(s), \qquad (13)$$

where, $e_{n,i}$ and $s_{n,i}$ are the normalized Euclidean distance and the similarity coefficient respectively, and max(•) is a function for finding a maximum value, and '•/' means element division.

8. The method of digital measuring color of fabrics based on a digital camera of claim 7, wherein the calculating the weighting coefficient of each of the color data of the plain fabrics based on the normalized Euclidean distance and the normalized similarity coefficient in the step 7 is expressed as equation (14):

$$w_i = s_{n,i} \cdot \exp\left(-\frac{e_{n,i}}{2}\right), \tag{14}$$

where, $w_i$ represents the weighting coefficient of the ith plain fabric, and exp(•) represents an exponential function.

9. The method of digital measuring color of fabrics based on a digital camera of claim 1, wherein the weighting each of the color data of the plain fabrics with the corresponding weighting coefficient in the step 8 is expressed as equation (15):

$$c_{w,i} = w_i \cdot c_i = (w_i \cdot L_i, w_i \cdot a_i, w_i \cdot b_i), \tag{15}$$

where, $c_{w,i}$ is a weighted color data of the ith plain fabrics, $w_i$ is the weighting coefficient of the ith plain fabric, $c_i$ is the color data of the ith plain fabric, $L_i$, $a_i$, and $b_i$ are luminance, red-green, and yellow-blue values of the ith plain fabric in a CIELab color space.

10. The method of digital measuring color of fabrics based on a digital camera of claim 1, wherein the summing the weighted color data of the plain fabrics to get the color data of the ROI in the target fabric in the step 9 is expressed as equation (16):

$$c_t = \frac{1}{N}\sum_{i=1}^{N} c_{w,i}, \tag{16}$$

where, $c_t$ is the color data of the ROI in the target fabric, $c_{w,i}$ is the weighted color data of the ith plain fabric, N is a total number of the plain fabrics; the measuring color of the ROI in the target fabric based on digital camera is completed.

* * * * *